(12) United States Patent
Gatewood et al.

(10) Patent No.: US 11,225,635 B2
(45) Date of Patent: Jan. 18, 2022

(54) BEVERAGE CONTAINERS WITH CONTROLLED OXYGEN TRANSMISSION FEATURES

(71) Applicant: BALL CORPORATION, Broomfield, CO (US)

(72) Inventors: Erik E. Gatewood, Arvada, CO (US); John L. Siles, Westminster, CO (US)

(73) Assignee: BALL CORPORATION, Westminster, CO (US)

( * ) Notice: Subject to any disclaimer, the term of this patent is extended or adjusted under 35 U.S.C. 154(b) by 530 days.

(21) Appl. No.: 16/059,796

(22) Filed: Aug. 9, 2018

(65) Prior Publication Data
US 2019/0048300 A1 Feb. 14, 2019

Related U.S. Application Data

(60) Provisional application No. 62/543,217, filed on Aug. 9, 2017.

(51) Int. Cl.
| | |
|---|---|
| *B65D 25/14* | (2006.01) |
| *B65D 81/24* | (2006.01) |
| *B65D 85/72* | (2006.01) |
| *C12H 1/14* | (2006.01) |
| *B65D 25/00* | (2006.01) |
| *B65D 17/00* | (2006.01) |
| *B65D 1/02* | (2006.01) |
| *C12H 1/22* | (2006.01) |

(52) U.S. Cl.
CPC ............ *C12H 1/14* (2013.01); *B65D 1/0207* (2013.01); *B65D 17/08* (2013.01); *B65D 25/00* (2013.01); *B65D 25/14* (2013.01); *B65D 81/245* (2013.01); *B65D 85/72* (2013.01); *C12H 1/22* (2013.01); *B65D 2205/00* (2013.01); *B65D 2517/0056* (2013.01)

(58) Field of Classification Search
CPC .... B65D 1/0207; B65D 25/14; B65D 81/245; B65D 85/72; C12H 1/14
See application file for complete search history.

(56) References Cited

U.S. PATENT DOCUMENTS

| | | | |
|---|---|---|---|
| 4,260,419 A | 4/1981 | Robertson | |
| 4,440,319 A * | 4/1984 | Nitchman | B67D 1/04 222/131 |

(Continued)

FOREIGN PATENT DOCUMENTS

| | | |
|---|---|---|
| AU | 156229 | 8/2004 |
| AU | 2004210605 | 9/2004 |

(Continued)

OTHER PUBLICATIONS

Explanatory Statement, Application A562, Copper Citrate as a Processing Aid for Wine, Mar. 2007, 30 pages.

(Continued)

*Primary Examiner* — Andrew T Kirsch
(74) *Attorney, Agent, or Firm* — Sheridan Ross P.C.

(57) ABSTRACT

Beverage containers are provided for storing liquid contents. In various embodiments, containers are provided with devices and means for allowing a controlled ingress or oxygen or similar material to the container contents. In preferred embodiments, devices and methods for storing wine are provided.

20 Claims, 12 Drawing Sheets

(56) References Cited

U.S. PATENT DOCUMENTS

| | | | |
|---|---|---|---|
| 5,094,867 A | | 3/1992 | Detering et al. |
| 5,624,534 A | | 4/1997 | Boucher et al. |
| 5,744,183 A | | 4/1998 | Ellsworth et al. |
| 5,827,555 A | | 10/1998 | Thorne |
| 5,972,402 A | | 10/1999 | Scholl et al. |
| 6,140,108 A | | 10/2000 | Mortimer et al. |
| 6,398,048 B1 | | 6/2002 | Kevorkian |
| 7,152,766 B1 | | 12/2006 | Walsh |
| 7,571,673 B2 | | 8/2009 | Zanon et al. |
| 9,139,342 B2 | * | 9/2015 | Cappello ............ B65D 51/1616 |
| 2001/0031376 A1 | | 10/2001 | Fulton et al. |
| 2004/0028778 A1 | | 2/2004 | Stokes et al. |
| 2004/0074862 A1 | | 4/2004 | Musaragno |
| 2004/0137109 A1 | | 7/2004 | Guglielmi et al. |
| 2004/0173556 A1 | | 9/2004 | Smolko et al. |
| 2005/0196499 A1 | | 9/2005 | Zanon et al. |
| 2005/0224423 A1 | | 10/2005 | Patton et al. |
| 2007/0128387 A1 | * | 6/2007 | Unwin ...................... C12H 1/12 |
| | | | 428/35.7 |
| 2007/0255623 A1 | | 11/2007 | Firer et al. |
| 2007/0299034 A1 | | 12/2007 | Versali et al. |
| 2008/0014317 A1 | | 1/2008 | Stokes et al. |
| 2008/0254164 A1 | | 10/2008 | Stokes et al. |
| 2009/0104308 A1 | | 4/2009 | Waidelich |
| 2009/0230081 A1 | | 9/2009 | Keller et al. |
| 2009/0297677 A1 | | 12/2009 | Zanon et al. |
| 2010/0104705 A1 | | 4/2010 | Gordon et al. |
| 2012/0199587 A1 | | 8/2012 | Norris |
| 2012/0228164 A1 | | 9/2012 | Aagaard et al. |
| 2013/0052309 A1 | | 2/2013 | Stubbs |
| 2013/0108746 A1 | | 5/2013 | Brendecke |
| 2013/0233821 A1 | * | 9/2013 | Golden .............. B65D 51/2807 |
| | | | 215/228 |
| 2014/0299566 A1 | * | 10/2014 | Takatomi ................. B65D 7/42 |
| | | | 215/12.2 |
| 2015/0079253 A1 | | 3/2015 | Stokes et al. |
| 2015/0322391 A1 | | 11/2015 | Stokes et al. |
| 2016/0096655 A1 | | 4/2016 | Stokes et al. |
| 2016/0201019 A1 | | 7/2016 | Stokes et al. |
| 2016/0236393 A1 | | 8/2016 | Lin |
| 2016/0346760 A1 | | 12/2016 | Peirsman et al. |
| 2016/0376263 A1 | * | 12/2016 | Patron .................. C07D 413/14 |
| | | | 514/784 |
| 2018/0163038 A1 | | 6/2018 | Peirsman et al. |
| 2019/0031988 A1 | | 1/2019 | Brendecke |

FOREIGN PATENT DOCUMENTS

| | | |
|---|---|---|
| AU | 2004100802 | 11/2004 |
| AU | 2004210603 | 12/2004 |
| AU | 2006203684 | 9/2006 |
| AU | 2010227113 | 4/2011 |
| AU | 2015100380 | 4/2015 |
| CH | 648993 | 4/1985 |
| DE | 2339975 | 8/1975 |
| DE | 19721920 | 12/1998 |
| DE | 212013000188 | 4/2015 |
| EP | 2607470 | 6/2013 |
| EP | 2607471 | 5/2014 |
| EP | 2767583 | 8/2014 |
| EP | 2861503 | 5/2016 |
| ES | 2046137 | 1/1994 |
| IN | 678DELNP2004 A | 6/2006 |
| IN | 11852DELNP2015 A | 5/2016 |
| JP | 2016-013377 | 1/2016 |
| NZ | 524585 | 3/2004 |
| TW | 201622685 | 7/2016 |
| WO | WO 00/73200 | 12/2000 |
| WO | WO 2006/026801 | 3/2006 |
| WO | WO 2006/105610 | 10/2006 |
| WO | WO 2008/116250 | 10/2008 |

OTHER PUBLICATIONS

Cowey, "Excessive Copper Fining of Wines Sealed Under Screwcaps—Identifying and Treating Reductive Winemaking Characters," Wine Business Monthly, Jul. 15, 2008, [retrieved on May 16, 2011], 7 pages. Retrieved from: http://www.winebusiness.com/wbm/?go=getArticle&dataId=58431.

Ferrarini et al. "Packaging of Wine in Aluminium Cans," Grape and Wine Research, Oenology Dept. of CRVE Grape and Wine Research Centre-Bologna University, 1992, No. 5, 11 pages.

Lee et al., "Origins of Flavour in Whiskies and a Revised Flavour Wheel: a Review," Journal of The Institute of Brewing, 2001, vol. 107, No. 5, pp. 287-313.

MoreWine "Copper Sulfate Trials," MoreFlavor! Inc., 2012, 2 pages [retrieved online from web.archive.org/web/20121019123113/http://morewinema king.com/public/pdf/wcoppersulfate.pdf].

Nygaard, "Does the choice of closure influence the sensory development of wines? Which closures are most 'green'?," The Australian & New Zealand Grapegrower & Winemaker, Aug. 2008, Iss. 535, 8 pages.

Nygaard, "Oxygen management from grape to glass," Wine Industry Journal, Sep./Oct. 2010, No. 25, No. 5, pp. 24-28.

RIXFORD "The Wine Press and the Cellar: A Manual for the Wine-maker and the Cellar-man," Payot, Upham & Company, 1883, p. 155, (6 pages).

Steeman, "Aluminium Bottles for Wine adding Value to the Drinking Experience," Best In Packaging, Jun. 20, 2009, 7 pages [retrieved from http://bestinpackaging.com/2009/06/20/aluminium-bottles-for-wine-adding-value-to-the-drinking-experience/].

Ugliano et al., "Evolution of 3-Mercaptohexanol, Hydrogen sulfide, and Methyl Mercaptan during Bottle storage of Sauvignon blanc Wines. Effect of Glutathione, Copper, Oxygen Exposure, and Closure-Derived Oxygen," Journal of Agricultural and Food Chemistry, 2011, vol. 59, pp. 2564-2572.

Ugliano et al., "Practical management of hydrogen sulfide during fermentation—an updated overview according to recent studies on red wine fermentation (AWRI publication #1121)," The Australian Wine Research Institute—Technical Review No. 180, Jun. 2009, 11 pages.

International Search Report and Written Opinion for International (PCT) Patent Application No. PCT/US2012/061512 dated Jan. 22, 2013, 14 pages.

International Preliminary Report on Patentability for International (PCT) Patent Application No. PCT/US2012/061512 dated May 15, 2014, 13 pages.

Official Action for Australia Patent Application No. 2012332920, dated Jul. 23, 2015 3 pages.

Notice of Acceptance for Australia Patent Application No. 2012332920, dated Dec. 17, 2015 2 pages.

Official Action for U.S. Patent Application No. 2015275314, dated Aug. 3, 2016 2 pages.

Notice of Acceptance for Australia Patent Application No. 2015275314, dated Jun. 29, 2017 3 pages.

Official Action for Australia Patent Application No. 2017235972, dated Jun. 12, 2018 3 pages.

Official Action for Australia Patent Application No. 2017235972, dated Mar. 18, 2019 4 pages.

Official Action for Canada Patent Application No. 2,853,792, dated May 11, 2015 3 pages.

Official Action for Canada Patent Application No. 2,853,792, dated Apr. 1, 2016 3 pages.

Notice of Allowance for Canada Patent Application No. 2,853,792, dated Oct. 12, 2016 1 page.

Extended European Search Report for European Patent Application No. 12846221.5, dated Nov. 10, 2015, 8 pages.

Official Action for European Patent Application No. 12846221.5, dated Apr. 5, 2018 5 pages.

Official Action for European Patent Application No. 12846221.5, dated Feb. 4, 2019 5 pages.

Official Action with English Translation for Mexico Patent Application No. MX/a/2014/005063, dated Jun. 22, 2018 9 pages.

Official Action for Mexico Patent Application No. MX/a/2014/005063, dated Jan. 11, 2019 3 pages.

(56) References Cited

OTHER PUBLICATIONS

International Search Report and Written Opinion for International (PCT) Patent Application No. PCT/US18/46071, dated Oct. 19, 2018 16 pages.
Official Action for U.S. Appl. No. 13/654,223, dated Sep. 12, 2014 5 pages Restriction Requirement.
Official Action for U.S. Appl. No. 13/654,223, dated Dec. 12, 2014 18 pages.
Official Action for U.S. Appl. No. 13/654,223, dated Jul. 6, 2015 16 pages.
Official Action for U.S. Appl. No. 13/654,223, dated Jun. 24, 2016 11 pages.
Official Action for U.S. Appl. No. 13/654,223, dated Feb. 1, 2017 9 pages.
Official Action for U.S. Appl. No. 13/654,223, dated Oct. 13, 2017 9 pages.
Official Action for U.S. Appl. No. 13/654,223, dated Jun. 28, 2018 13 pages.
Official Action for U.S. Appl. No. 16/147,101, dated Dec. 27, 2018 11 pages.
Official Action (with English Translation) for Brazil Patent Application No. BR112014010306-2, dated Nov. 1, 2019 15 pages.
Official Action (with English Translation) for Brazil Patent Application No. BR112014010306-2, dated Feb. 3, 2020 15 pages.
Official Action (with English translation) for Brazil Patent Application No. BR122019017408-3, dated Dec. 19, 2019 12 pages.
Official Action (with English translation) for Brazil Patent Application No. BR122019017408-3, dated Apr. 8, 2020 5 pages.
Official Action (no English translation) for Mexico Patent Application No. MX/a/2014/005063, dated Feb. 27, 2020 8 pages.
Official Action (no English translation) for Mexico Patent Application No. MX/a/2014/005063, dated Aug. 20, 2020 2 pages.
International Preliminary Report on Patentability for International (PCT) Application No. PCT/US18/46071, dated Feb. 20, 2020, 11 pages.
Official Action for U.S. Appl. No. 16/147,101, dated Apr. 3. 2020 10 pages.
Notice of Acceptance for Australia Patent Application No. 2017235972, dated Jun. 5, 2019 4 pages.
Certificate of Grant for Australia Patent Application No. 2017235972, granted Oct. 3, 2019 1 page.
Official Action with English Translation for Brazil Patent Application No. BR112014010306-2, dated Apr. 25, 2019 15 pages.
Official Action for U.S. Patent Application No. 12846221.5, dated Jun. 28, 2019 3 pages.
Official Action with English Summary for Mexico Patent Application No. MX/a/2014/005063, dated Jul. 26, 2019 5 pages.
Official Action for U.S. Appl. No. 16/147,101, dated Jul. 30, 2019 11 pages.
Notice of Allowance for European Patent Application No. 12846221.5, dated Feb. 18, 2021, 29 pages.
Official Action (no English translation available) for Chile Patent Application No. 202000339, dated Apr. 8, 2021, 11 pages.
Extended European Search Report for European Patent Application No. 18844956, dated Apr. 14, 2021, 9 pages.

* cited by examiner

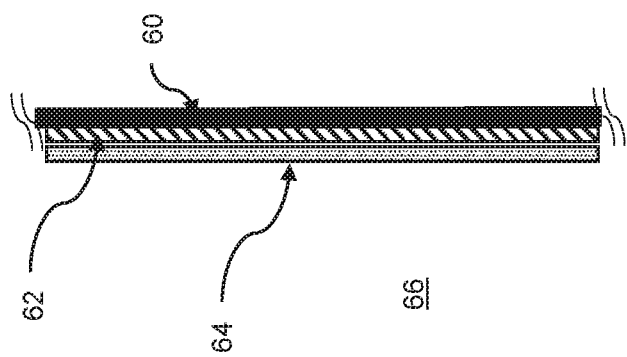

BEVERAGE CONTAINERS WITH CONTROLLED OXYGEN TRANSMISSION FEATURES

This U.S. Non-Provisional Patent Application claims the benefit of priority from U.S. Provisional Patent Application Ser. No. 62/543,217, filed Aug. 9, 2017, the entire disclosure of which is hereby incorporated by reference.

FIELD

The present disclosure relates generally to beverage containers. More specifically, the present disclosure relates to beverage containers with devices and systems for providing a mechanism for the ingress of oxygen or other additives to container contents.

BACKGROUND

Many disposable beverage containers including aluminum cans substantially prevent oxygen and other fluids from entering the container when the container is sealed. In various applications, this is a desired feature for containers to preserve quality and freshness of container contents, prevent contaminants from entering the container, etc. However, certain beverages and contents to be stored within containers benefit from and/or require a controlled ingress or egress of oxygen to prolong shelf-life and prevent spoliation. Such contents include, for example, wine which is known to benefit from a controlled ingress of oxygen when stored and which is known to spoil and produce odors when provided in a completely sealed container or environment. Thus, the use of permeable corks in wine bottles has been used for centuries in association with wine bottles to prevent spoilage and foul odors.

Wine making typically includes pressing fruit (typically, grapes) to obtain a fruit juice, fermenting the fruit juice, maturing the fruit juice to form wine and, after maturation, bottling the wine. Typically, the fermentation and maturation processes are carefully controlled to develop preferred organoleptic characteristics. However, due to the characteristics of the fruit (such as, growing, harvesting and/or storage conditions), maturation process (such as, temperature, oxidation, and such), and/or bottling (such as, oxygen, wine composition, container and closure system) unwanted odors and/or flavors can develop during one or both of the fermentation and maturation processes. The unwanted odors and/or flavors are typically removed by treating the wine with a fining agent. The fining agent is usually separated from the wine prior to bottling the wine. Examples of fining agents include isinglasse, bentonite, galatin, casein, carrageenan, alginate, diatomaceous earth, pectinase, pectolase, polycar, colloidal silica, copper sulfate, albumen, hydrated yeast, activated carbon, and potassium caseinate. The unwanted odor and/or flavor are typically associated with sulfur and/or sulfur-containing compounds. The sulfur and/or sulfur-containing compounds may be present in the fruit juice that wine is prepared from, may develop during fermentation and/or maturation, and/or may develop as the wine and/or wine-type ages during storage. In some instances, the generation of sulfur and/or sulfur-containing compounds can be minimized, or substantially eliminated, by storing and/or aging the wine in a container having a cork, which typically permits the ingress and/or egress of gas, including oxygen. Oxygen can prevent, or at less minimize, the formation of sulfur and/or sulfur-containing compounds.

However, unwanted odors and/or flavors can develop when wine is stored in containers having non-cork closure systems including, for example, metal end closures, screw-on caps, and similar systems. Unwanted odor and flavor development is particularly problematic in wines bottled in metallic containers, even more particularly to wines bottled in metallic containers having metallic lids and/or closure systems. Since it is more cost effective to manufacture, fill and transport containers made from metallic materials as opposed to traditional glass, there is a significant need in the beverage and container industries to manufacture and utilize metallic containers for wine and other alcoholic beverages, yet reduce the unwanted odor and flavor caused by sulfur and/or other sulfur-containing compounds.

Thus, a significant need exists for a bottling process that reduces unwanted odor and/or flavor formation in wines bottled in metallic containers, particularly for wines bottled in metallic containers having metallic lids and/or closure systems.

SUMMARY

These and other needs are addressed by the various embodiments and configurations of the present disclosure. This disclosure relates to a container system for reducing and/or eliminating unwanted odor and flavor in wines and other contents, and to a method for forming the container system for reducing and/or eliminating unwanted odor and/or flavor in packaged beverages. More specifically, this disclosure relates to a metallic container system and to a system for reducing and/or eliminating unwanted odor and/or flavor in bottled wine and wine-like beverages.

In various embodiments of the present disclosure, the controlled introduction and/or elimination of oxygen and other gas into a beverage and/or beverage headspace within a container is provided.

In one embodiment, an aperture or vent is provided in an end-closure, sidewall or other portion of a container and an insert comprising a permeable plastic or other material is provided in the aperture. The insert provides ambient air comprising oxygen to pass through and into the container at a consistent and controlled rate.

In some embodiments, it is contemplated that a gas-permeable insert is connected to a container body by a double-seam. The container body may be deformed or otherwise comprise an upstanding annular portion that is operable to receive an insert and double-seam the insert to the container through known double-seaming operations.

In some embodiments, it is contemplated that a rivet of an end closure comprises a gas-permeable feature wherein at least a portion of the rivet is provided as a gas-permeable feature to allow for ingress of oxygen and/or egress of various gases.

In another embodiment, an insert is affixed to an internal surface of a container and the insert comprises a predetermined amount of gas at least partially comprising oxygen. The insert provides for controlled diffusion and release of oxygen to container contents.

In various embodiments, inserts of the present disclosure comprise one or more permeable materials, including but not limited to resins. Resins for use with inserts of the present disclosure include, but are not limited to: polyesters such as polyethylene terephthalate (PET), polylactic acid (PLA) or polyethylene naphthalate (PEN); polypropylene including low density PE (LDPE), high density PE (HDPE), and/or ethylene/vinyl alcohol (EVOH). Properties of the polymer films such as thickness, orientation, crystallinity and molecular weight can be adjusted to refine the oxygen permeability.

In various embodiments, the resin(s) can be combined to create multi-layer structures to achieve combined features. For instance, EVOH can be encased in PET to provide oxygen permeation resistance from the EVOH with the PET protecting the EVOH from moisture and providing structural stability and strength. In some embodiments, organic and inorganic coatings are applied to reduce oxygen permeation. Inorganic are contemplated as comprising oxides of silicon and aluminum. In some embodiments, such films are applied by physical vapor deposition or chemical vapor deposition applied to the product and/or public side of the package. Reactive additives are dispersed in the polymer films to refine oxygen permeation in some embodiments. Such additives are contemplated as reacting with transitioning oxygen to impede egress into the package.

In various embodiments, containers of the present disclosure are provided with a liner or coating known as SARANEX™, which is commercially available. Interior walls of the containers of the present disclosure and/or inserts are contemplated as comprising SARANEX, polyethylene (PE), polypropylene (PP), polystyrene (PS), polyamides (PA, polycarbonate (PC), polyurethanes (PU), polyvinyl chloride (PVC), polyvinylidene chloride (PVDC), acrylonitrile butadiene styrene (ABS), polyepoxide (epoxy), polymethyl methacrylate (PMMA) (acrylic), polytetrafluoroethylene (PTFE), Teflon™, silicone, polysulfone, and/or expanded polyethylene. In some embodiments, an insert is provided to enable ingress and egress of gas from a container to an outside environment. In such embodiments, a coating such as SARANEX need not be provided. It is also contemplated, however, that embodiments of the present disclosure comprise a SARANEX or similar coating in addition to or in lieu of inserts as shown and described herein.

In some embodiments, inserts and/or linings of the present disclosure are provided as comprising at least one of polyethylene, PVDC, expanded polyethylene, tin, white kraft, EPE, white paper, LDPE, extrudiertes polyethylene, SARAN, and SARANEX.

In some embodiments, thermoplastic elastomers ("TPE") is provided to create a seal between an insert and a container. TPE may be provided to create a seal for various different inserts as shown and described herein.

In some embodiments, it is contemplated that an insert is provided through a sidewall of a beverage container and wherein the insert comprises cork. For example, in one embodiment, an insert is provided comprising a plastic material with an embedded cork insert and wherein the plastic portion of the insert is operable to connect or attached to the container and the cork is operable to enable gas transmission into and/or out of the container.

In another embodiment, a coating is applied to at least a portion of an internal surface of a container. The coating comprises the ability to retain oxygen and release the oxygen into container contents and/or a headspace in a filled container at a controlled rate after the can is filled and closed.

In some embodiments, one or more transition metals are provided as a component of a plastic insert. For example, in certain embodiments, it is contemplated that a laminated foil is provided within a "widget" or floating insert and wherein diffusion of wine and/or transition metal is regulated by pores or holes in the widget. In other embodiments, a plastic "disc" is provided that is infused with or otherwise comprises a transition metal. The disc may be adhered to an interior of a beverage container or allowed to float within a beverage. In further embodiments, it is contemplated that a metalized plastic film is provided within and on a portion of a beverage container.

In some embodiments, a plurality of coatings are applied to an interior of a beverage container. A first coating is applied directly to an aluminum container (for example), and the first coating comprises a known coating to protect the container material from being oxidized by container contents. A second coating is applied over and on at least a portion of the first coating. In some embodiments, the second coating comprises a transition metal as disclosed herein. In other embodiments, the second coating comprises a permeable or semi-permeable coating that allows fluid (e.g. can contents) to flow to and contact the first coating, and wherein the first coating comprises at least one transition metal to preserve the container contents and reduce formation of odor (particularly when the container contents are provided as wine).

In some embodiments, a method of bottling or packaging a beverage is contemplated wherein high levels of oxygen are provided in the beverage and/or in a headspace of a container in which the beverage is stored upon filling a container.

In some embodiments of the present disclosure, a method for reducing unwanted odor and/or flavor in a wine is provided by contacting a transition metal-containing compound with the wine to form a treated wine. The treated wine contains the transition metal-containing compound. The method includes filling a metal container with one of the wine, the treated wine or a combination of both and sealing the container containing the treated wine with a metallic closure system. The contacting of the wine with the transition metal-containing compound generally occurs after one or both of the fermentation and maturation processes. The wine may further include one or both of a non-fermented fruit juice and soda water.

In some embodiments of the present disclosure, methods for reducing unwanted odor and/or flavor in a bottled wine are provided by contacting the wine with a copper-containing compound to form a treated wine and sealing the treated wine in a metallic container having a metallic closure system to form a bottled wine. Preferably, the contacting of the wine with the transition metal-containing compound is conducted after one or both of fermentation and maturation of the wine. Preferably, the transition metal-containing compound comprises an insoluble transition metal-containing compound. The treated wine is preferably a copper-containing wine.

In various embodiments, metal containers are provided comprising aluminum. The metallic container has a predetermined volume. The predetermined volume being defined by a container wall interconnected to a container bottom and a metallic closure system. The metallic closure system is preferably an end closure, a lid or a screw cap. The container bottom and metallic closure system are in an opposing relationship. In some embodiments, the method further includes substantially filling the predetermined volume with the treated wine. In some embodiments, the treated wine substantially fills the predetermined volume.

In another embodiment, the metallic container and/or metallic closure system comprise a transition metal. In some configurations, the metallic container and/or metallic closure system comprise aluminum. Preferably, the transition metal is copper.

In such embodiments, contacting the wine with the transition metal-containing metallic container and/or closure system forms the treated wine. Furthermore, in some embodiments, contacting the wine with the transition metal-containing metallic container and/or closure system releases at least some transition metal in the wine to form the treated wine. Moreover, in some embodiments, contacting the wine with the transition metal-containing metallic container and/or closure system removes one or both of unwanted odor and flavor from the wine to form the treated wine.

In various embodiments, it is contemplated that containers and methods of the present disclosure provide a wine or juice product with up to approximately 2.0 mg/L of copper sulfate, and more preferably not exceeding 1.0 mg/L of copper sulfate, and most preferably of about 0.5 mg/L copper sulfate.

Preferably, the container is an aluminum container having a predetermined volume for receiving the wine. A container bottom, wall and end closure define the predetermined volume. The container wall and bottom may be formed simultaneously by a draw/redraw process or may be formed from two distinct components. Furthermore, the container wall defines an aperture adapted to receive the metallic closure system. More preferably, the metallic container and the metallic closure system are substantially impervious to one or both of oxygen permeation and transmission.

The transition metal-containing compound contains a transition metal selected from the group of metals consisting of scandium, titanium, manganese, iron, cobalt, nickel, copper, zinc, yttrium, zirconium, niobium, molybdenum, ruthenium, rhodium, palladium, silver, hafnium, tantalum, tungsten, rhenium, iridium, platinum, and gold. Preferably, the transition metal-containing compound comprises copper.

While not wanting to be bound by theory, the contacting of the transition metal-containing compound with one or both of sulfur and a sulfur-containing compound forms an insoluble compound. The insoluble compound is believed to contain the transition metal and the one or both of the sulfur and sulfur-containing compound.

Typically, the sulfur and/or sulfur-containing compound is preferably are one of sulfide ($S^{2-}$), hydrogen sulfide ($HS^-$), dihydrogen sulfide ($H_2S$), mercaptan (R—SH), 3-mercaptohexanol ($CH_3CH_2CH(SH)CH_2CH_2OH$), methyl mercaptan, and/or a mixture thereof. Commonly, the insoluble compound contains the transition metal and at least one of sulfide ($S^{2-}$), hydrogen sulfide ($HS^-$), dihydrogen sulfide ($H_2S$), mercaptan (R—SH), 3-mercaptohexanol ($CH_3CH_2CH(SH)CH_2CH_2OH$), methyl mercaptan ($CH_3SH$), ethyl mercaptan ($CH_3CH_2SH$), 2-mercatoethanol ($HOCH_2CH_2SH$) or a combination thereof.

Preferably, the transition metal is copper. The copper preferably forms an insoluble compound with the sulfur and/or sulfur-containing compound. Commonly, the insoluble compound contains copper (II) and at least one of sulfide ($S^{2-}$), hydrogen sulfide ($HS^-$), dihydrogen sulfide ($H_2S$), mercaptan (R—SH), 3-mercaptohexanol ($CH_3CH_2CH(SH)CH_2CH_2OH$), methyl mercaptan ($CH_3SH$), ethyl mercaptan ($CH_3CH_2SH$), 2-mercatoethanol ($HOCH_2CH_2SH$) or a combination thereof.

In a preferred embodiment, the treated and/or transition metal-containing wine contains no more than about 0.2 ppm copper. In a more preferred embodiment, the treated wine contains copper in the form of copper (II). In an even more preferred embodiment, the treated wine contains copper in the form of copper sulfate.

Another aspect of the present invention is a method for reducing unwanted odor in a wine-type beverage by contacting the wine-type beverage with a copper-containing material to form a treated wine-type beverage. The contacting of the wine-type beverage with the copper-containing material forms a treated wine-type beverage, and sealing the treated wine-type beverage in a container to form a bottled beverage. The container is sealed with an end closure. Preferably, the container comprises one of an aluminum container or glass container. The container has a predetermined volume, the predetermine volume defined by a container wall and a container bottom. The container wall defines a neck on an upper end to receive the end closure.

Some embodiments include filling the predetermined volume substantially with the treated wine-type beverage, and sealing the end closure to neck of the container to form the bottled beverage. Preferably, the container is substantially impervious to one or both of oxygen permeation and transmission. The end closure is at least one of a screw cap, a cork and a pull tab.

Preferably, the copper-containing material forms an insoluble copper-containing compound with sulfur or a sulfur-containing compound. The sulfur and/or sulfur-containing compound comprise one or more of sulfide ($S^{2-}$), hydrogen sulfide ($HS^-$), dihydrogen sulfide ($H_2S$), mercaptan (R—SH), 3-mercaptohexanol ($CH_3CH_2CH(SH)CH_2CH_2OH$), methyl mercaptan ($CH_3SH$), ethyl mercaptan ($CH_3CH_2SH$), 2-mercatoethanol ($HOCH_2CH_2SH$) or a combination thereof. The copper-containing material is one of added to wine-type beverage or contained within the container.

U.S. Patent Application Publication No. 2013/0108746 to Brendecke, which is hereby incorporated by reference in its entirety, discloses various systems and methods for providing transition metals in containers which are contemplated for use with embodiments of the present disclosure.

Although various embodiments of the present disclosure contemplate containers that are useful for and/or operable to store wine, it should be recognized that the disclosure is not limited to devices for use with wine or any other particular product.

As used herein, the following terms and meanings are provided:

"Wine" refers to wine and wine-type alcoholic and non-alcoholic beverages, including wine coolers, beers, mixed drinks and other combinations currently sold in grocery, package, or liquor stores.

"Wine-type beverages" refer to beverages containing fermented and/or matured wine and one or both of a non-fermented fruit juice and soda water.

Wine and wine-type beverages will be used interchangeably. That is, wine can refer to a wine-type beverage and wine-type beverage can refer to a wine.

"Bottled wine" refers to wine, after fermentation and/or maturation, stored in a sealed container. The sealed container can include one or more metallic components, such as the container body, end closure, breathable metallic cap and/or metallic bottle adapted to receive a cork closure. A breathable metallic cap refers to a metallic cap that can allow for at least some oxygen transmission in the sealed container. Preferably, the breathable metallic cap has oxygen transmission properties similar to a cork closure system. The breathable metallic cap transmits sufficient oxygen to the bottled wine to substantially mitigate aerobic conditions and formation of sulfur and/or sulfur-containing compounds.

"Transition metal" generally refers to a metal bellowing to groups 4-12 of the periodic table. A transition metal generally has an atomic number selected from the group of atomic numbers of 21-30, 39-48, and 72-80.

These and other advantages will be apparent from the disclosure of the invention(s) contained herein.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples.

Further features and advantages will become apparent from the following, more detailed, description of the various embodiments of the invention(s), as illustrated by the drawings referenced below.

FIG. 11 is a cross-sectional elevation view of a portion of a beverage container according to one embodiment of the present disclosure.

DETAILED DESCRIPTION

Figure 1:
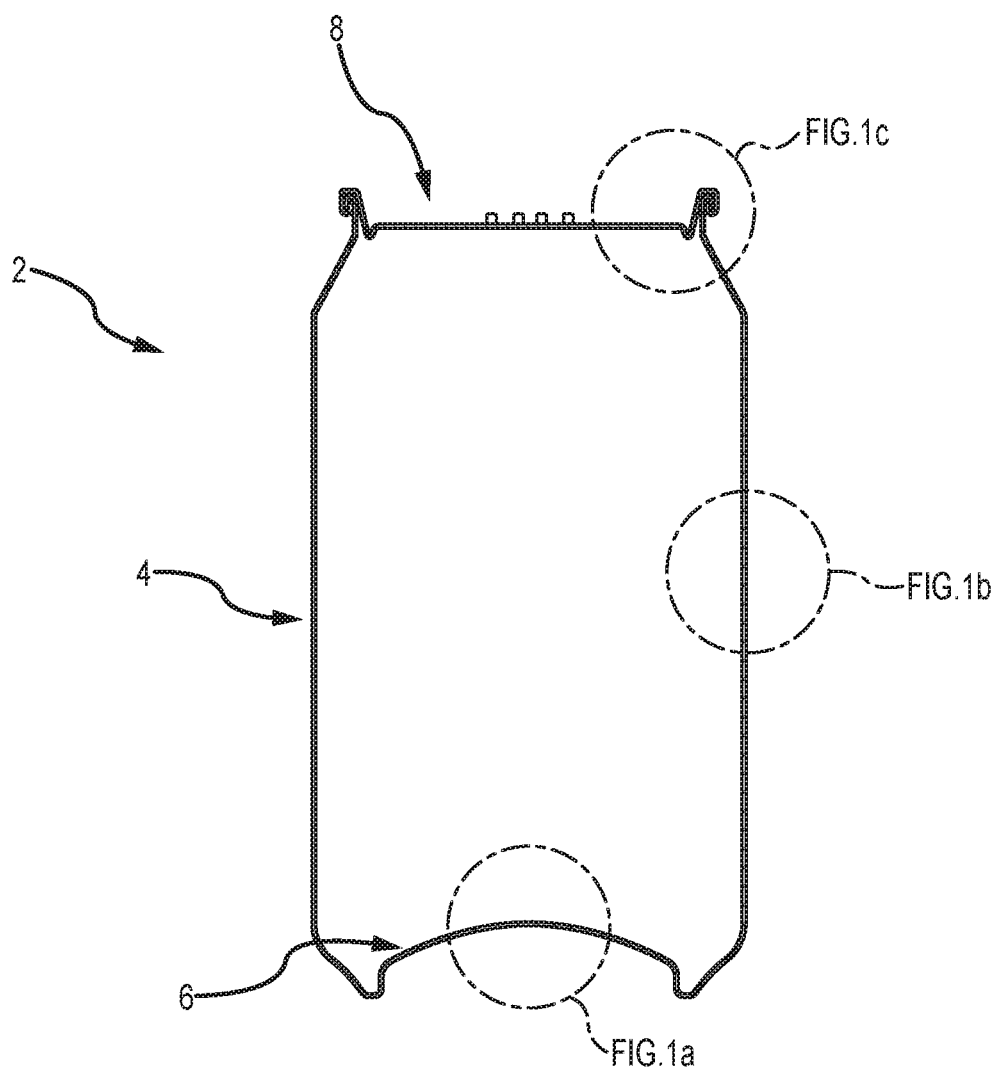
FIG. 1 is a cross-sectional elevation view of a beverage container according to one embodiment of the present disclosure.

FIG. 1 is a cross-sectional elevation view of a beverage container 2 according to one embodiment of the present disclosure. As shown, the beverage container 2 comprises various features of known metal beverage containers including a container body 4, a domed portion 6, and an end closure 8. The cross-section of FIG. 1 is taken at the center of the container, and the container generally comprises a rotationally symmetrical object with the exception of certain features of the end closure.

Figure 1A:
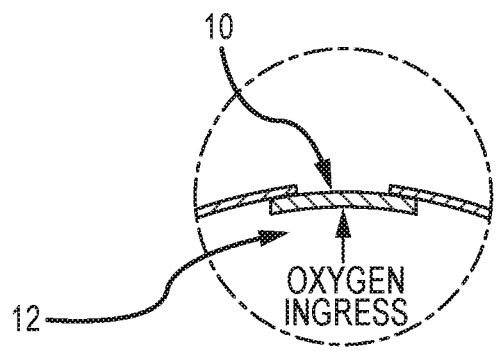
FIG. 1a is a detailed cross-sectional elevation view of a portion of the beverage container of FIG. 1.

FIG. 1a is a detailed cross-sectional view of a portion of the container 2 of FIG. 1. As shown in FIG. 1a, a system for oxygen transmission is contemplated as being provided in a portion of the domed portion on the lower end of the container 2. As shown in FIG. 1a, at least one aperture 10 is provided in the domed portion 6 of the container 2. The aperture 10 is provided with a permeable insert 12. The permeable insert 12 preferably comprises a liquid seal that prevents container contents from leaking or otherwise exiting the container, and comprises the ability to allow oxygen to enter the container and come into contact with container contents. In some embodiments, the insert 12 comprises a plastic insert. It is further contemplated that the insert 12 comprises a one-way valve structure that allows for ingress of ambient air and oxygen into the container and substantially prevents fluids (gas and liquid) from exiting the container. Alternatively, the insert allows gas i.e., oxygen and other gases to ingress and egress the container. In some embodiments, inserts are provided and contemplated that allow for gas to both enter and exit a container. In such embodiments, the insert(s) operate in a similar manner to cork material wherein some limited permeability of air and gas is provided both into and out of the container. In some embodiments, the insert comprises a natural cork or synthetic cork material to achieve this result.

Figure 1B:
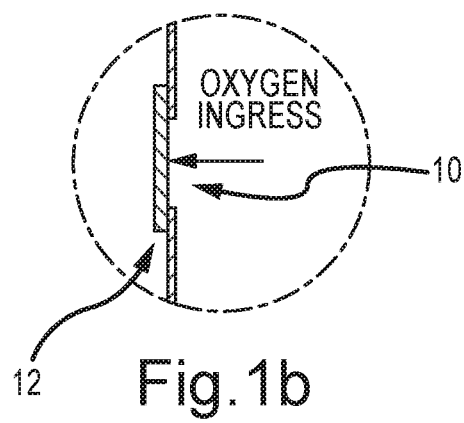
FIG. 1b is a detailed cross-sectional elevation view of a portion of the beverage container of FIG. 1.

FIG. 1b is a detailed cross-sectional view of a portion of the container of FIG. 1, and wherein an aperture 10 and a permeable insert 12 as described above are provided in a sidewall 4 of the container.

Figure 1C:
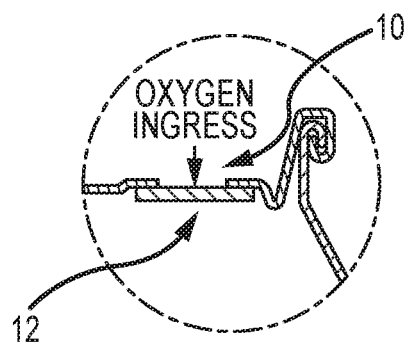
FIG. 1c is a detailed cross-sectional elevation view of a portion of the beverage container of FIG. 1.

FIG. 1c is a detailed cross-sectional view of a portion of the container of FIG. 1, and wherein an aperture 10 and a permeable insert 12 as described above are provided in an end closure 8 of the container.

Collectively, FIGS. 1a-1c depict an aperture 10 and a permeable insert 12 provided in combination with the domed portion 6, the sidewall 4, and the end closure 8 of the container 2. Embodiments of the present disclosure contemplate that an aperture 10 and permeable insert 12 are provided in as few as one of the locations and embodiments shown in FIGS. 1a-1c. It should therefore be recognized that the embodiments of the present disclosure are not limited to apertures and inserts being provided in all three of the locations shown in FIGS. 1a-1c. It is contemplated, for example, that an aperture and insert combination is provided only in the bottom domed portion of the container. In other embodiments, containers 2 of the present disclosure comprise a plurality of apertures 10 and associated inserts 12.

Figure 2:
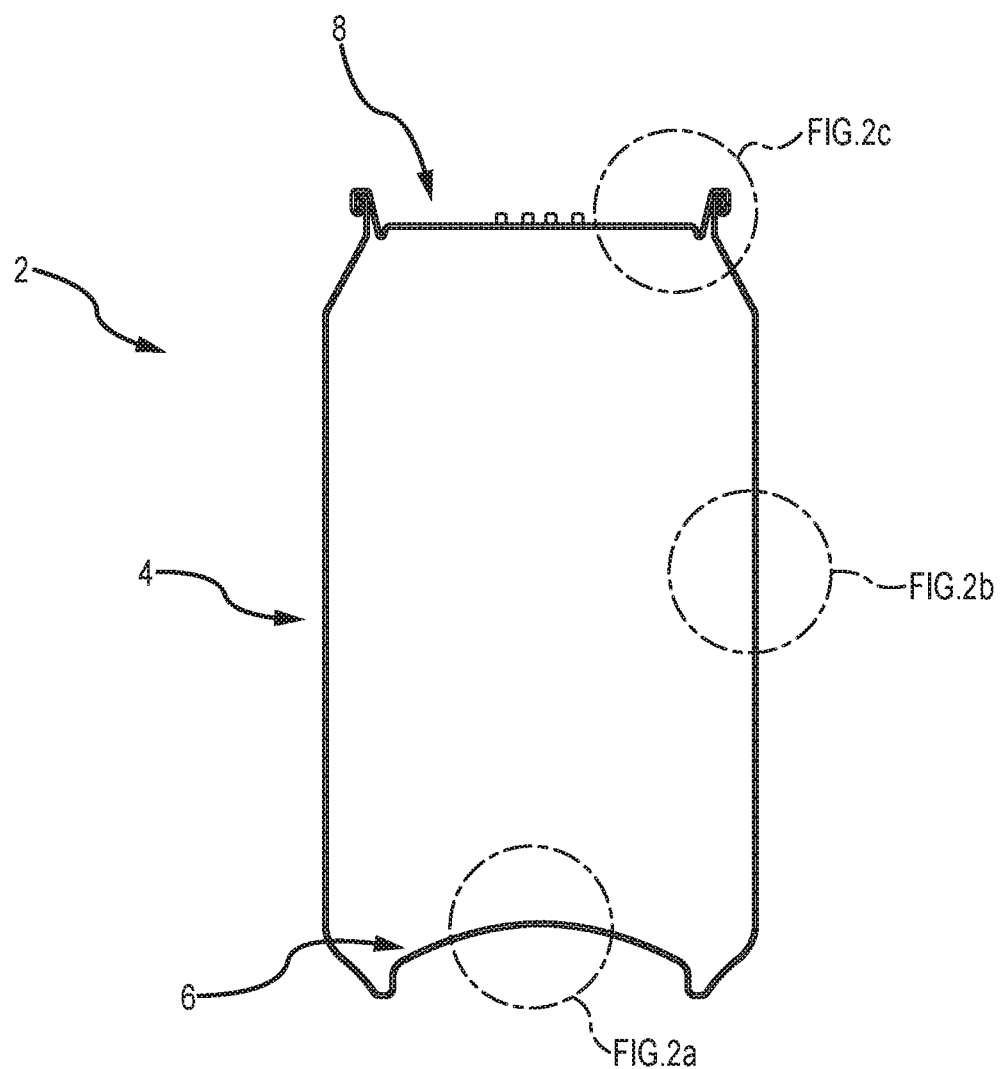
FIG. 2 is a cross-sectional elevation view of a beverage container according to one embodiment of the present disclosure.

FIG. 2 is a cross-sectional elevation view of a beverage container 2 according to one embodiment of the present disclosure. As shown, the beverage container 2 comprises various features of known metal beverage containers including a container body 4, domed portion 6, and an end closure 8. The cross-section of FIG. 1 is taken at the center of the container, and the container generally comprises a rotationally symmetrical object with the exception of certain features of the end closure.

Figure 2A:
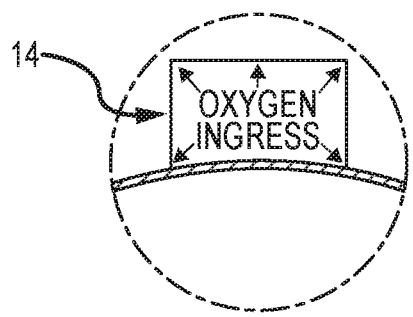
FIG. 2a is a detailed cross-sectional elevation view of a portion of the beverage container of FIG. 2.

FIG. 2a is a detailed cross-sectional view of a portion of the container 2 of FIG. 2. As shown in FIG. 2a, a system for oxygen transmission is contemplated as being provided in a portion of the domed portion on the lower end of the container 2. The system comprises an insert 14 provided within an interior volume of the container 2. In certain embodiments, the insert 14 comprises a device with a predetermined quantity of oxygen and wherein the insert 14 is operable to dispense the predetermined quantity of oxygen to container contents. In some embodiments, it is contemplated that the insert 14 is operable to dispense or provide oxygen even when the container is provided with an internal pressure and sealed. In such embodiments, the internal pressure of the sealed container does not prevent the oxygen within the insert 14 from escaping into container contents.

Figure 2B:
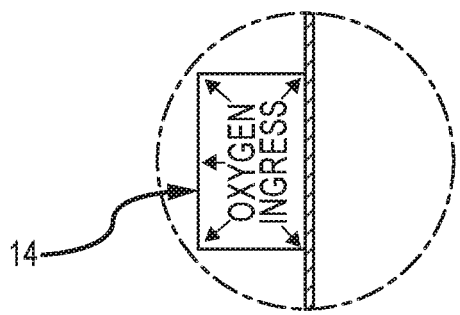
FIG. 2b is a detailed cross-sectional elevation view of a portion of the beverage container of FIG. 2.

FIG. 2b is a detailed cross-sectional view of a portion of the container of FIG. 2, and wherein an insert 14 as described above is provided on an interior portion of a sidewall 4 of the container.

Figure 2C:
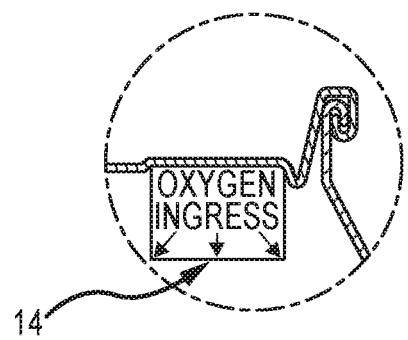
FIG. 2c is a detailed cross-sectional elevation view of a portion of the beverage container of FIG. 2.

FIG. 2c is a detailed cross-sectional view of a portion of the container of FIG. 2, and wherein an insert 14 as described above is provided on a product-side of an end closure 8 of the container. In FIG. 2c, the insert is provided as being positioned in and releasing oxygen to a head space of the container (i.e. an unfilled volume of internal portion of the container). In FIG. 2c, the insert 14 thus diffuses or dispenses oxygen or other fluid to the head space (typically comprising air) from where it then diffuses or contacts the liquid contents of the container.

Collectively, FIGS. 2a-2c depict an insert 14 provided in combination with the domed portion 6, the sidewall 4, and the end closure 8 of the container 2. Embodiments of the present disclosure contemplate that an insert 14 is provided in as few as one of the locations and embodiments shown in FIGS. 2a-2c. It should therefore be recognized that the embodiments of the present disclosure are not limited to inserts being provided in all three of the locations shown in FIGS. 2a-2c. It is contemplated, for example, that an insert is provided only in the bottom domed portion of the container. In other embodiments, containers 2 of the present disclosure comprise a plurality inserts 14. The inserts 14 of FIGS. 2a-2c may be adhered or secured to one or more internal portions of the container 2 through a variety of known methods, means and devices. For example, in some embodiments, the inserts 14 are secured to an internal surface of the container by an adhesive and/or by welding.

Figure 3:
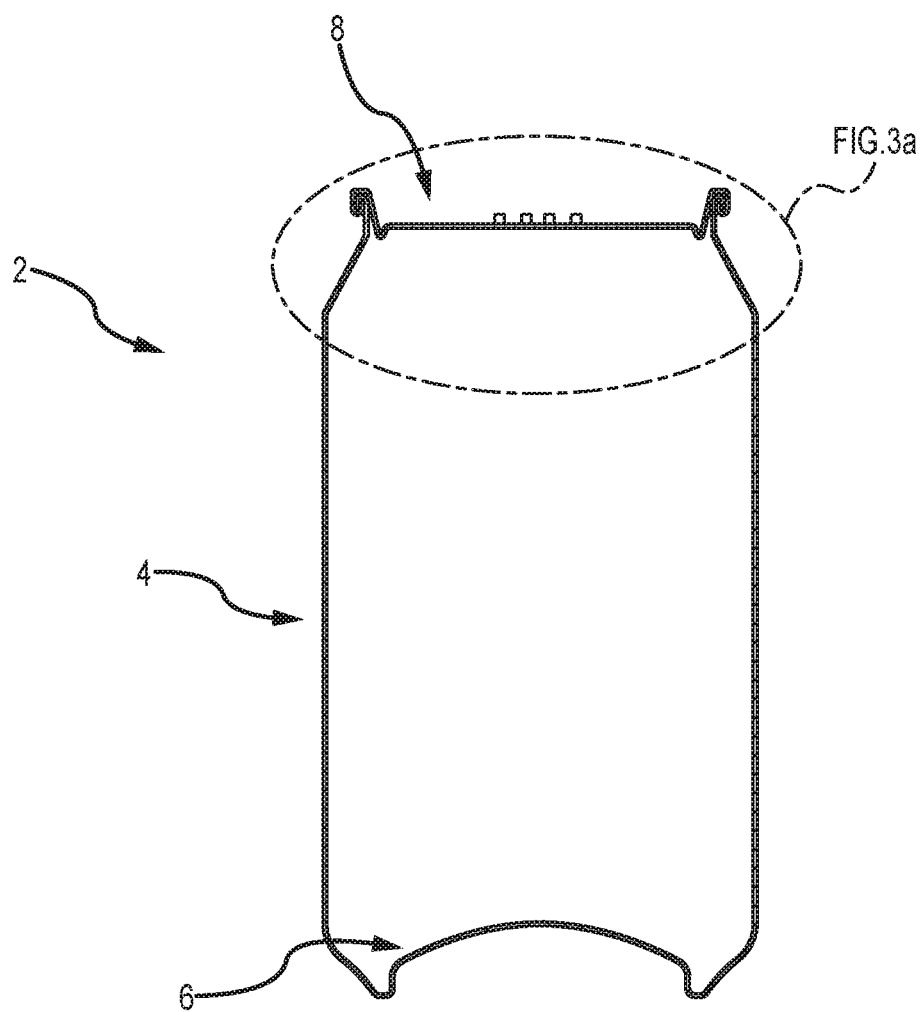
FIG. 3 is a cross-sectional elevation view of a beverage container according to one embodiment of the present disclosure.

FIG. 3 is a cross-sectional elevation view of a beverage container 2 according to one embodiment of the present disclosure. As shown, the beverage container 2 comprises various features of known metal beverage containers including a container body 4, domed portion 6, and an end closure 8. The cross-section of FIG. 3 is taken at the center of the container, and the container generally comprises a rotationally symmetrical object with the exception of certain features of the end closure.

Figure 3A:
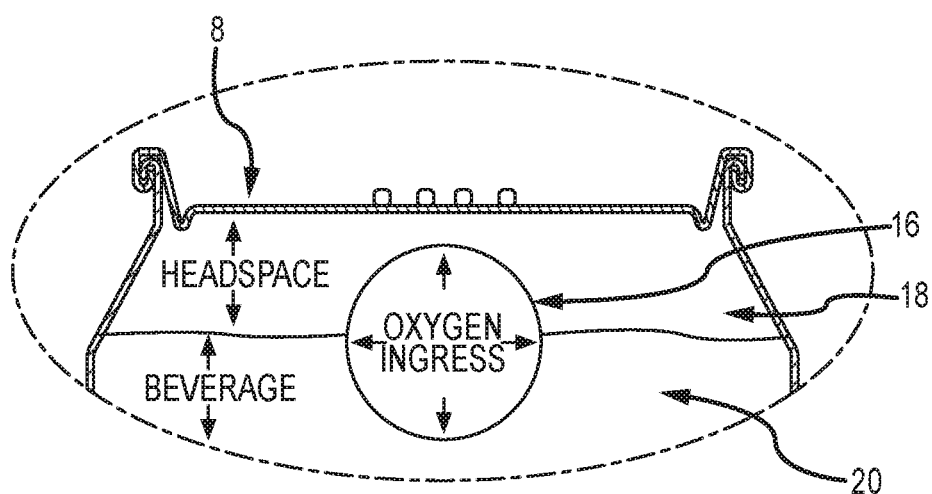
FIG. 3a is a detailed cross-sectional elevation view of a portion of the beverage container of FIG. 3.

FIG. 3a is a detailed cross-sectional elevation view of the container 2 of the embodiment of FIG. 3 as indicated in FIG. 3. As shown in FIG. 3a, the container comprises a free-floating insert 16 provided within an internal volume of the container 2. The insert 2 comprises buoyancy and a predetermined quantity of oxygen which is diffused to the head-space 18 of the container and/or liquid contents 20 of the container 2. The insert 16 is operable to dispense oxygen while the container 2 is sealed and/or when the container is opened. In various embodiments, it is contemplated that the insert 16 comprises a buoyancy such that the insert floats in the contents and contacts both the liquid contents and the head space within the container. In alternative embodiments, however, it is contemplated that the insert 16 is neutrally-buoyant or negatively-buoyant.

Figure 4:
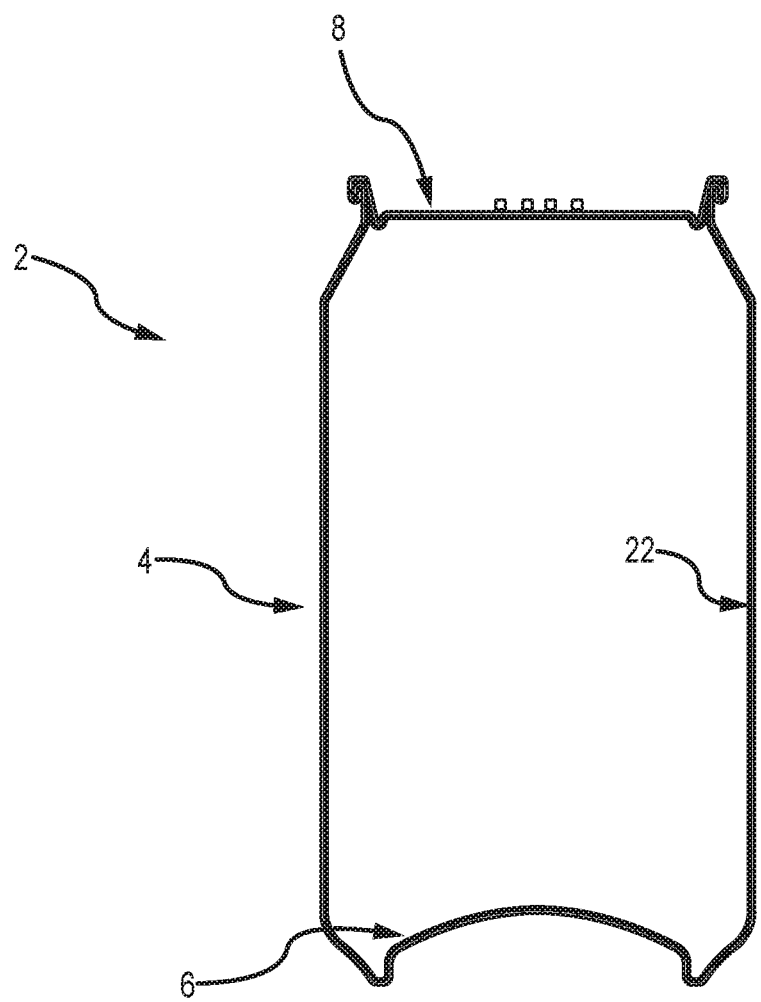
FIG. 4 is a cross-sectional elevation view of a beverage container according to one embodiment of the present disclosure.

FIG. 4 is a cross-sectional elevation view of a beverage container 2 according to one embodiment of the present disclosure. As shown, the beverage container 2 comprises various features of known metal beverage containers including a container body 4, domed portion 6, and an end closure 8. The cross-section of FIG. 4 is taken at the center of the container, and the container generally comprises a rotationally symmetrical object with the exception of certain features of the end closure. The embodiment of FIG. 4 comprises a coating 22 provided over a least a portion, in some embodiments a substantial majority, of the interior surface of the container 2. The coating 22 comprises oxygen and the coating 22 is operable to release or diffuse the oxygen into the container contents. In various embodiments, the coating 22 comprises a transition metal as discussed herein.

The coating can include a transition metal. The transition metal can be provided to reduce unwanted odor or flavors in wine. The coating containing the transition metal can be in addition to other coatings on the surface of the container. The transition metal coating can cover all, or a portion of the container, or can cover all, or a portion of other coatings on the container. Furthermore, in some embodiments, at least one layer of the coating can include the transition metal. In some embodiments, the coating can be multilayered. In some embodiments, the transition metal coating layer(s) can be within other coating layers, where the inner coating layer(s) are permeable to allow the sulfur and/or sulfur-containing compound to react with the transition metal coating. In some embodiments, the coating can include the transition metal compound, but can be positioned in the container to prevent contact between the transition metal coating and the container itself. The transition metal can be contained in the coating by immobilization, chelation, or combinations thereof. The coating can be permeable to treat the sulfur and/sulfur-containing compound.

In some embodiments, the transition metal can be included on an insert that can be included in the container. The insert can be sized to provide a particular amount of the transition metal to treat the wine. More than one insert can be provided, and the insert can be adhered to the container as described herewith. The dimensions of the insert can result in a surface area of between about 0.2 square inches and about 5.0 square inches. In some embodiments, between about one insert and about 6 inserts can be included in the container. The insert can be located on the side wall of the container, on the bottom end of the container or on the end closure of the container (on the interior surfaces).

The transition metal can be provided as a compound. The transition metal compound can contain the transition metal, which can be selected from the group of metals consisting of scandium, titanium, manganese, iron, cobalt, nickel, copper, zinc, yttrium, zirconium, niobium, molybdenum, ruthenium, rhodium, palladium, silver, hafnium, tantalum, tungsten, rhenium, iridium, platinum, gold, or combinations of one or more of these transition metals. In some embodiments, the transition metal can be a metal from Groups 3-12 of the periodic table, which generally have an atomic number selected from the group of 21-30, 39-48, and 72-80. Preferably, the transition metal-containing compound comprises copper. In some embodiments, the copper can be copper (I) or copper (II). In some embodiments, the transition metal advantageously may not dissociate and can appreciably increase the amount of the transition metal in the wine to remove unwanted odors and/or flavors.

While other transition metals can be used, copper can be preferably used. Thus, additional information about copper will be provided, though one skilled in the art would understand how the discussion related to copper can be applicable to other transition metals.

The copper-containing compound can include any copper containing compound. Preferably, the copper-containing compound comprises a water-soluble copper compound. More preferably, the copper-containing compound comprises a water-soluble copper (II) compound. Non-limiting examples of water-soluble copper containing compounds comprise copper sulfate, copper nitrate, copper chloride, copper bromide, copper iodide, copper acetate, copper butanoate, copper citrate, copper ethylacetonate, copper formate, copper gluconate, copper iodate, copper 2, 4-pentadioate, copper tartate, copper tetrafluoroburate, copper benzoate or mixtures thereof of a combination of these coper containing compounds. According to some embodiments, the copper-containing compound can include copper sulfate, copper benzoate, or a mixture thereof.

In some embodiments, the transition metal containing compound can be hydrated. By way of example, the copper containing compound can be hydrated copper sulfate. The hydrated copper sulfate can have any degree of hydration. In some embodiments, the copper sulfate can contain for each mole of copper from about 1 to about 12 moles of water, more commonly from about 3 to about 10 moles of water, even more commonly form about 4 to about 6 moles of water, or yet even more commonly about 5 moles of water. In some embodiments, for each mole of copper, no more than one mole of water, more commonly no more than two moles of water, even more commonly no more than three moles of water, yet even more commonly no more than four moles of water, still yet even more commonly no more than five moles of water, still yet even more commonly no more than six moles of water, still yet even more commonly no more than seven moles of water, still yet even more commonly no more than eight moles of water, still yet even more commonly no more than nine moles of water, still yet even more commonly no more than ten moles of water, still yet even more commonly no more than eleven moles of water, or still yet even more commonly no more than twelve moles of water.

In some embodiments, the transition metal compound can be in an anhydrous form. In some embodiments, the copper sulfate can be provided in an anhydrous form.

The contacting of the transition metal compound with the untreated wine forms a treated wine. The treated wine can comprise the copper-containing compound in a substantially dissolved, dissociated state in the treated wine. The treated wine contains no more than about 1 ppm of the coper-containing compound, in some embodiments less than or equal to about 0.2 ppm of the copper-containing compound. Typically, treated wines having no more than about 0.2 ppm copper are less corrosive to aluminum containers than treated wines having more than about 0.2 ppm copper. More typically, treated wines having about 0.2 ppm are less corrosive to the aluminum container than treated wines having more than 0.2 ppm copper. In some embodiments, the treated wine contains no more than about 0.15 ppm of the copper-containing compound, still yet even more commonly no more than about 0.1 ppm of the copper-containing compound, still yet even more commonly no more than about 0.05 ppm of the copper-containing compound, still yet even more commonly no more than about 0.025 ppm of the copper-containing compound, still yet even more commonly no more than about 0.01 ppm of the copper-containing compound, or still yet even more commonly no more than about 0.005 ppm of the copper-containing compound.

Furthermore, while it is understood that the container itself can include copper or another transition metal (or combination thereof), which can contribute to the reaction of the sulfur and/or sulfur containing compound, the transition metal content of the aluminum alloy can be coated with a coating to protect the container from reactive elements that can corrode the container. Thus, in some embodiments, the transition metal that reacts with the fluid can be predominantly (i.e. greater than about 90%) from the coating or insert containing the transition metal or transition metal compound.

The transition metal compound can be incorporated into a coating, or incorporated into an insert(s). The coating can be provided to at least a portion of the container or to at least a portion of a coating on the container. In some embodiments, the transition metal coating can be provided to between about 5% and about 100% of the surface area of the interior of the container or a coating on the container. In some embodiments, the transition metal can be included in one or more insert, which can be provided to the container.

In some embodiments, the wine can contain sulfur or a sulfur-containing compound that contributes or causes the unwanted odor or flavor in the bottled wine. The sulfur and/or sulfur-containing compound can be a sulfide ($S^{2-}$), hydrogen sulfide ($HS^-$), dihydrogen sulfide ($H_2S$), mercaptan (R—SH), 3-mercaptohexanol ($CH_3CH_2CH(SH)CH_2CH_2OH$), methyl mercaptan, ethyl mercaptan ($CH_3CH_2SH$), 2-mercatoethanol ($HOCH_2CH_2SH$) and/or a mixture thereof.

When combined with the transition metal, the sulfur and/or sulfur-containing compound can react to form an insoluble compound. By way of example, copper (II) preferably forms an insoluble compound with the sulfur and/or sulfur-containing compound, including copper (II) and at least one of sulfide ($S^{2-}$), hydrogen sulfide ($HS^-$), dihydrogen sulfide ($H_2S$), mercaptan (R—SH), 3-mercaptohexanol ($CH_3CH_2CH(SH)CH_2CH_2OH$), methyl mercaptan ($CH_3SH$), ethyl mercaptan ($CH_3CH_2SH$), 2-mercatoethanol ($HOCH_2CH_2SH$) or a combination thereof.

While not wanting to be limited by theory, it is believed that the copper forms substantially insoluble sulfur-containing copper compounds with one or more of the sulfur and/or sulfur-containing compounds. The formation of the substantially insoluble sulfur-containing copper compound substantially removes the unwanted odor and/or flavor from the wine.

In some embodiments, the wine can be fined to remove fines from the wine prior to bottling. Examples of fining agents include isinglasse, bentonite, galatin, albumen, casein, carrageenan, alginate, diatomaceous earth, pectinase, pectolase, polycar, colloidal silica, copper sulfate, albumen, hydrated yeast, activated carbon, polyvinylpolypyrrolidone and potassium caseinate. Other fining methods, such as decanting, or filtering, can be utilized to remove the fines in addition to the fining agents, or without the fining agents.

An aspect of the invention is a container comprising a transition metal coating. The transition metal coating has been described in greater detail above, and that discussion is incorporated by reference as if reproduced here. In some embodiments, the container can further include a wine. The wine can be treated to remove fines, or untreated to remove fines.

An aspect of the invention is a container comprising at least one transition metal insert. The transition metal insert has been described in greater detail above, and that discussion is incorporated by reference as if reproduced here. In some embodiments, the container can further include a wine. The wine can be treated to remove fines, or untreated to remove fines.

Figure 5:
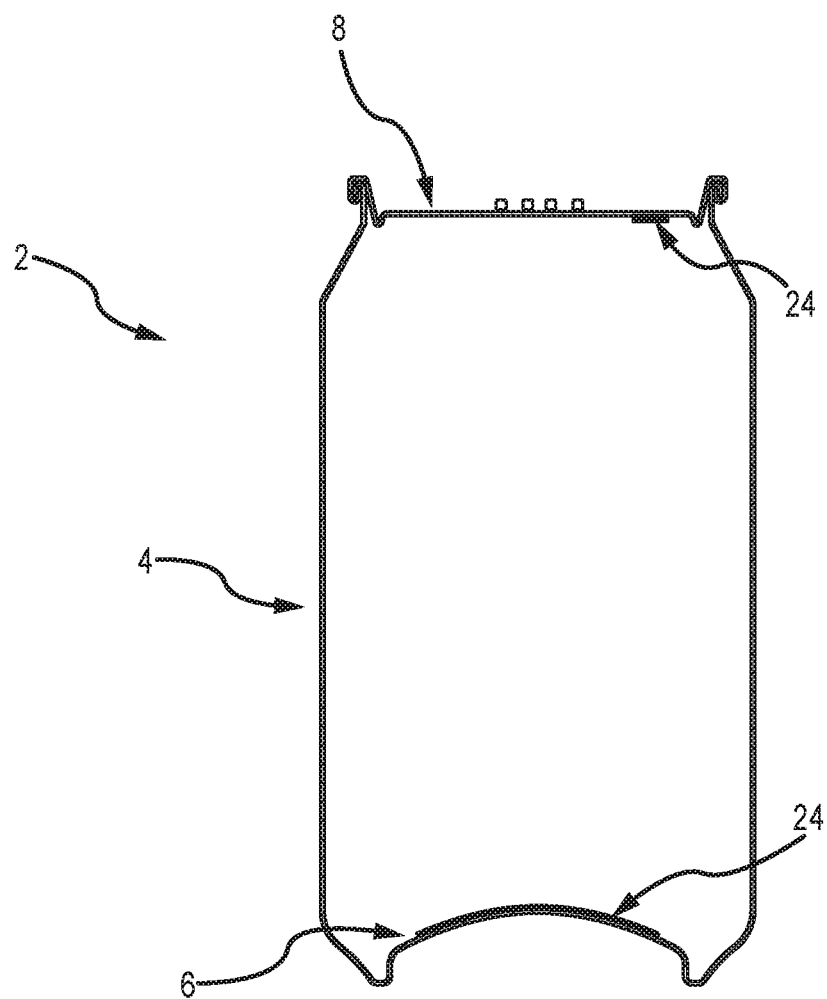
FIG. 5 is a cross-sectional elevation view of a beverage container according to one embodiment of the present disclosure.

FIG. 5 is a cross-sectional elevation view of a beverage container 2 according to one embodiment of the present disclosure. As shown, the beverage container 2 comprises various features of known metal beverage containers including a container body 4, domed portion 6, and an end closure 8. The cross-section of FIG. 5 is taken at the center of the container, and the container generally comprises a rotationally symmetrical object with the exception of certain features of the end closure. The embodiment of FIG. 5 comprises a spot coating 24 provided on a portion of the container. The coating 24 compromises oxygen and the coating 24 is operable to release or diffuse the oxygen into the container contents. As shown in FIG. 5, the coating 24 may be provided on an interior portion of the dome 6 and/or the end closure 8. Although not shown in FIG. 5, the spot coating 24 may be provided on an interior portion of a sidewall of the container body, either in addition to or in lieu of the spot coatings 24 shown in FIG. 5.

Figure 6:
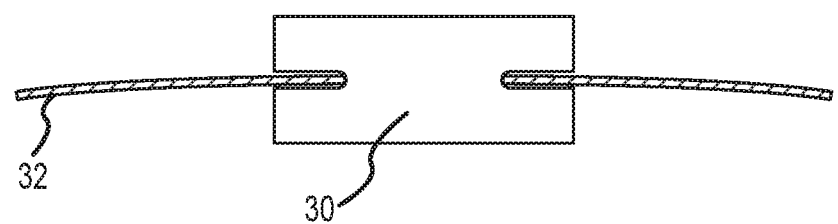
FIG. 6 is a cross-sectional elevation view of an insert according to one embodiment of the present disclosure.

FIGS. 6-10 are various cross-sectional elevation views showing methods and systems of attaching a gas-permeable insert to a container. The inserts of FIG. 6-10 are contemplated as comprising features, structure and functionality of various gas-permeable inserts as shown and described herein. FIG. 6 is a cross-sectional elevation view of a container 32 and insert 30 according to one embodiment of the present disclosure. As shown, an insert 30 is provided and is connected to a portion of a container body 32. The portion of the container body 32 may comprise an end closure, sidewall, domed bottom, or other part of a container. The insert 30 of FIG. 6 comprises an injection molded part that is secured to an aperture provided in the container 62. The insert 30 comprises flanges on either side (i.e. public and product sides) of the container.

Figure 7A:
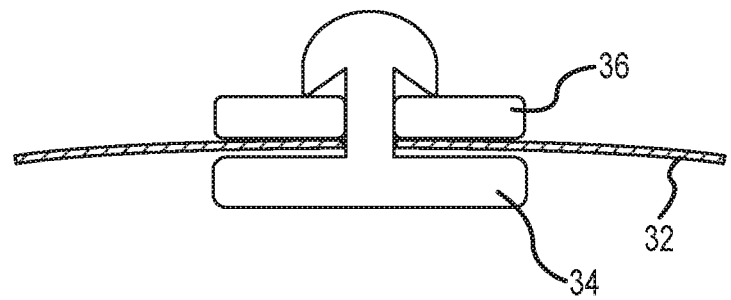
FIG. 7a is a cross-sectional elevation view of an insert according to one embodiment of the present disclosure.
Figure 7B:
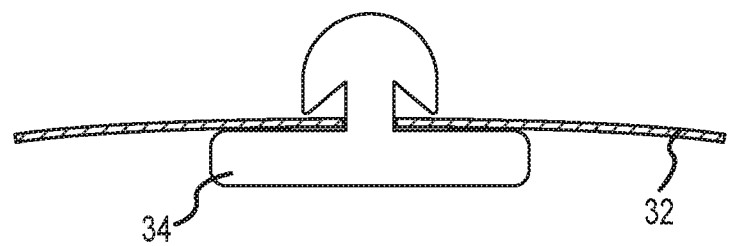
FIG. 7b is a cross-sectional elevation view of an insert according to one embodiment of the present disclosure.
Figure 7C:
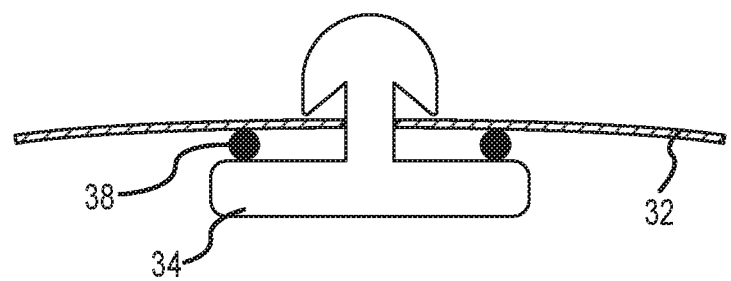
FIG. 7c is a cross-sectional elevation view of an insert according to one embodiment of the present disclosure.

FIGS. 7a-7c depict various different snap-fit inserts 34 provided in a container 32. The oxygen-permeable insert 34 of FIG. 7a comprises a snap-fit head or protrusion that extends through an aperture in the container and is at least partially secured by a washer 36 or other sealing element provided opposite a flange of the insert 34. FIG. 7b depicts an insert 34 of substantially the same construction as that of FIG. 7a, and wherein the washer is not provided. In the embodiment of FIG. 7b, a protrusion of the snap-fit insert 34 extends through and secures to the container 32. FIG. 7c is a cross-sectional elevation view of a snap-fit insert 34 secured to a container 32 and wherein a TPE seal ring is provided.

Figure 8:
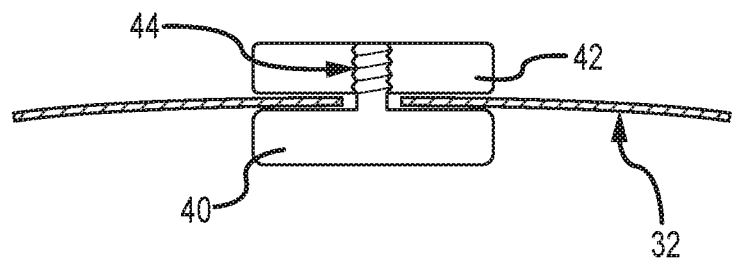
FIG. 8 is a cross-sectional elevation view of an insert according to one embodiment of the present disclosure.

FIG. 8 is a cross-sectional elevation view of a container 32 with a gas-permeable insert 40 according to another embodiment of the present disclosure. As shown, the insert 40 comprises a threaded assembly with a threaded male portion 44 extending through the container 32 and securable to a female threaded member 42 on an opposing side of the container from a remainder of the insert 40.

Figure 9:
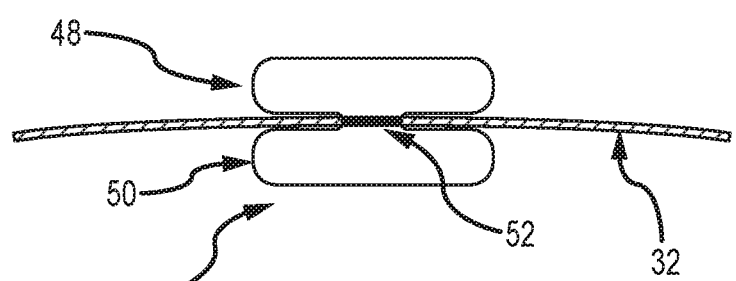
FIG. 9 is a cross-sectional elevation view of an insert according to one embodiment of the present disclosure.

FIG. 9 is a cross-sectional elevation view of a container 32 with a gas-permeable insert 46 according to another embodiment of the present disclosure. As shown, the insert 46 comprises a first member 46 and a second member 48 and wherein the first member and the second member are ultrasonically welded at a union 52.

Figure 10:
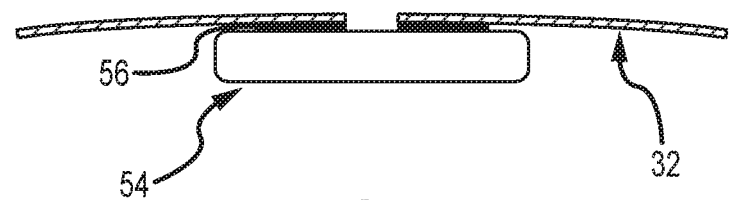
FIG. 10 is a cross-sectional elevation view of an insert according to one embodiment of the present disclosure.

FIG. 10 is a cross-sectional elevation view of a container 32 with a gas-permeable insert 54 according to another embodiment of the present disclosure. As shown, the insert 54 is secured to one side of a portion of the container 32 by an adhesive 56. The adhesive 56 is contemplated as comprising a food grade epoxy, for example, and may be distributed around the circumference of an annular insert 56 or only a portion thereof.

FIG. 11 is a cross-sectional elevation view of a container according to one embodiment of the present disclosure. As shown, the container comprises a metal body portion 60. The portion 60 shown in FIG. 11 may be a portion of a sidewall, end closure, or bottom portion of a container. A first coating 62 is applied to the body portion 60, and a second coating 64 is applied to the first coating 62. A fluid-receiving volume 66 is provided internal to the second coating, with the body portion 60 provided as a fluid containing container. In some embodiments, the first coating 62 comprises a conventional coating to protect the can body from the fluid housed therein, as will be recognized by one of ordinary skill in the art. In such embodiments, the second coating comprises a coating with an infused transition metal coating, such as a copper sulfate-infused coating. In other embodiments, it is contemplated that one or more transition metals are provided in the first coating 62, and the second coating 64 comprises a permeable coating that allows for contact between the fluid housed in the fluid space 66 (e.g. wine) to contact the transition-metal-infused first coating 62. The coating(s) shown in FIG. 11 may be provided on a portion of a container sidewall, bottom domed portion, end closure, or various combinations thereof. In some embodiments, the entirety of the inside of a can body is provided with the coatings of FIG. 11. In other embodiments, only a portion of an interior of a can body is provided with a coating.

Ranges have been discussed and used within the forgoing description. One skilled in the art would understand that any sub-range within the stated range would be suitable, as would any number within the broad range, without deviating from the invention.

The present invention, in various embodiments, configurations, or aspects, includes components, methods, processes, systems and/or apparatus substantially as depicted and described herein, including various embodiments, configurations, aspects, sub-combinations, and subsets thereof. Those of ordinary skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A metal beverage container, comprising:
   a container body having a lower portion and an upper portion;
   an end closure interconnected to the upper portion;
   a sidewall extending between the upper portion and the lower portion; and
   an aperture provided in and extending through the end closure;
   a gas permeable insert provided in the aperture and fixed to the end closure, and wherein the gas permeable insert comprises a liquid seal that prevents container contents from exiting the container and that is operable to allow the ingress or egress of at least one of air and oxygen to an internal volume of the container; and
   wherein the remainder of the metal beverage container apart from the gas permeable insert comprises a gas and liquid impermeable material.

2. The metal beverage container of claim 1, wherein the gas permeable insert comprises a membrane.

3. The metal beverage container of claim 1, wherein the gas permeable insert comprises a snap-fit insert that extends through the aperture and is secured to the end closure.

4. The metal beverage container of claim 1, wherein the gas permeable insert is provided in or on an interior portion of the end closure.

5. The metal beverage container of claim 1, wherein the container comprises more than one gas permeable insert.

6. The metal beverage container of claim 1, wherein the gas permeable insert comprises a plastic insert adhered to an interior surface of the container and wherein the gas permeable insert is operable to contact fluid contents of the container.

7. The metal beverage container of claim 1, wherein the gas permeable insert extends through the aperture.

8. The metal beverage container of claim 1, wherein the gas permeable insert comprises a coating applied to an internal surface of the gas permeable insert.

9. A metal beverage container for holding a wine product comprising:
   a container body having a lower portion and an upper portion;
   the lower portion comprising a domed portion;
   the upper portion comprising an end closure;
   a sidewall extending between the upper portion and the lower portion; and
   an aperture provided in at least one of the end closure and the domed portion, and wherein the aperture comprises an insert having a material to reduce the formation of odorous gas in the wine product.

10. The metal beverage container of claim 9, wherein the material comprises copper sulfate.

11. The metal beverage container of claim 9, wherein the material -comprises at least one of polyethylene, PVDC, expanded polyethylene, tin, white kraft, EPE, white paper, LDPE, extrudiertes polyethylene, SARAN, and SARANEX.

12. The metal beverage container of claim 9, wherein the material comprises a coating which retains and releases oxygen into the container and/or a headspace in a filled container at a controlled rate.

13. The metal beverage container of claim 9, wherein the container comprises an aluminum beverage container.

14. The metal beverage container of claim 9, wherein the material comprises a transition metal.

15. The metal beverage container of claim 14, wherein the transition metal is selected from the group of metals consisting of: scandium, titanium, manganese, iron, cobalt, nickel, copper, zinc, yttrium, zirconium, niobium, molybdenum, ruthenium, rhodium, palladium, silver, hafnium, tantalum, tungsten, rhenium, iridium, platinum, and gold.

16. A method of bottling wine comprising:
   providing a metal beverage container comprising:
      a container body having a lower portion and an upper portion;
      the lower portion comprising a domed portion;
      the upper portion comprising an end closure;
      a sidewall extending between the upper portion and the lower portion; and
      an aperture provided in at least one of the end closure and the domed portion, and wherein the aperture comprises a permeable insert that is
   operable to provide at least one of air and oxygen to an internal volume of the container;
      wherein the remainder of the metal beverage container apart from the insert comprises a gas and liquid impermeable container;
   filling the container with a predetermined quality of wine;
   sealing the container by providing a metal end closure and double-seaming the metal end closure to the upper portion of the container body; and
   subjecting the predetermined quantity of wine to a gradual and controlled ingress of oxygen by the insert.

17. The method of claim 16, wherein the domed portion and the end closure each comprise an aperture and wherein permeable inserts are provided in the apertures to provide a sealed container.

18. The method of claim 16, wherein the permeable insert is provided in or on an interior portion of the domed portion.

19. The method of claim 16, wherein the permeable insert is provided in or on an interior portion of the end closure.

20. The method of claim 16, wherein the wine contains no more than about 0.2 ppm copper.

* * * * *